(12) United States Patent
Kojima

(10) Patent No.: US 6,741,570 B1
(45) Date of Patent: May 25, 2004

(54) CELL BUFFER USE RATE MONITORING METHOD AND SYSTEM

(75) Inventor: Tomoaki Kojima, Tokyo (JP)

(73) Assignee: NEC Corporation, Tokyo (JP)

( * ) Notice: Subject to any disclaimer, the term of this patent is extended or adjusted under 35 U.S.C. 154(b) by 779 days.

(21) Appl. No.: 09/617,502

(22) Filed: Jul. 17, 2000

(30) Foreign Application Priority Data

Jul. 16, 1999  (JP) ............................................. 11-202399

(51) Int. Cl.⁷ ............................. H04L 12/26; H04L 1/00
(52) U.S. Cl. ........................ 370/253; 370/232; 370/233
(58) Field of Search ................................ 370/229, 235, 370/237, 238, 238.1, 230, 232, 241, 252, 253, 254, 255, 351, 389, 395.1, 398, 399; 709/238; 455/452

(56) References Cited

U.S. PATENT DOCUMENTS

| | | | | |
|---|---|---|---|---|
| 5,563,874 A | * | 10/1996 | Kant ........................... | 370/252 |
| 5,859,835 A | * | 1/1999 | Varma et al. ................ | 370/229 |
| 5,898,669 A | * | 4/1999 | Shimony et al. ............. | 370/232 |
| 5,898,671 A | * | 4/1999 | Hunt et al. ................... | 370/235 |
| 6,046,983 A | * | 4/2000 | Hasegawa et al. ......... | 370/236.1 |
| 6,144,636 A | * | 11/2000 | Aimoto et al. .............. | 370/229 |
| 6,259,698 B1 | * | 7/2001 | Shin et al. ................. | 370/395.7 |
| 6,389,026 B1 | * | 5/2002 | Kozaki et al. .............. | 370/398 |

FOREIGN PATENT DOCUMENTS

| | | | | |
|---|---|---|---|---|
| JP | A 4-120835 | 4/1992 | ........... | H04L/12/48 |
| JP | 10322360 | 4/1998 | | |
| JP | A 11-122267 | 4/1999 | ........... | H04L/12/28 |
| JP | A 2000-295231 | 10/2000 | ........... | H04L/12/28 |

* cited by examiner

Primary Examiner—Kenneth Vanderpuye
Assistant Examiner—Anthony Ton
(74) Attorney, Agent, or Firm—Young & Thompson

(57) ABSTRACT

A cell buffer use rate monitoring method allowing a memory required for detecting the currently used amount of a cell buffer to be reduced. A monitoring time and a plurality of cell buffer thresholds are previously set in a setting data memory. A cell buffer use rate is calculated based on the number of cells received within the monitoring time and the number of times a currently used cell buffer amount has exceeded each of the cell buffer thresholds.

20 Claims, 6 Drawing Sheets

CELL BUFFER USE RATE MONITORING METHOD AND SYSTEM

BACKGROUND OF THE INVENTION

1. Field of the Invention

The present invention relates to an ATM (Asynchronous Transfer Mode) switching system in an ATM network, and more particularly to a method and system for monitoring a cell buffer use rate in the ATM switching system.

2. Description of the Art

In general, an ATM switching system is provided with a cell buffer for each input/output port. Traffic such as voice/data in ATM cells is transferred from an input cell buffer to a selected output cell buffer through an interconnection established in a switch fabric.

Since a limited amount of shared buffer memory is used to form a number of input/output cell buffers in a cell buffer module, it is necessary to allocate an appropriate buffer to each input/output port. If the amount of allocated memory is larger than necessary, the use efficiency of the shared buffer is decreased. Contrarily, if the amount of allocated memory is smaller than necessary, the required QoS (Quality of Service) such as Cell Loss Ratio cannot be satisfied.

Accordingly, buffer allocation needs to be adjusted by properly monitoring a cell buffer use rate. Moreover, by monitoring the cell buffer use rate, the traffic in an ATM switching system can also be analyzed and thereby the optimum network can be constructed by redistributing network equipment such as a buffer module.

As one example of a conventional ATM-related technique, there has been disclosed an ATM network system in Japanese Patent Application Unexamined Publication No. 10-322360. More specifically, the conventional ATM network system has a buffer use rate monitoring means and a transmission means. The buffer use rate monitoring means monitors the use rate of an input/output buffer in each node of the ATM network. When the monitoring means detects that the use rate exceeds a first threshold indicating the congestion state, the transmission means generates a cell indicating a congestion state and transmits it to anther node. When the monitoring means detects that the use rate is lower than a second threshold indicating the non-congestion state, the transmission means generates a cell indicating a non-congestion state and transmits it to another node.

The above-described conventional ATM network, however, does not disclose now to obtain a cell buffer use rate. Further, if a cell buffer use rate is obtained by totaling occupied amounts of all cell buffers used to store received cells, then a much large memory is necessary in proportion to the number of cells received and a monitoring time period.

SUMMARY OF THE INVENTION

An object of the present invention is to provide a cell buffer use rate monitoring method and system allowing a memory required for detecting the currently used amount of a cell buffer to be reduced.

According to the present invention, a method for monitoring a use rate of a cell buffer in an ATM (asynchronous transfer mode) switch, wherein the cell buffer is connected to a line in an ATM network, includes the steps of: a) setting a predetermined monitoring time period and a plurality of cell buffer thresholds: b) counting cells received at the cell buffer for the predetermined monitoring time period to produce a received cell count; c) detecting a currently used amount of the cell buffer; d) counting a number of times the currently used amount of the cell buffer has exceeded each of the plurality of cell buffer thresholds for the predetermined monitoring time period to produce a threshold-excess count; and e) calculating the use rate of the cell buffer based on the received cell count and the threshold-excess count.

The step (c) may include the steps of: c.1) incrementing a cell counter when a cell has been received at the cell buffer; c.2) decrementing the cell counter when a cell has been transmitted from the cell buffer; and c.3) detecting a current value of the cell counter as the currently used amount of the cell buffer.

The step (d) may include the steps of: d.1) when a cell has been received at the cell buffer, determining whether the currently used amount of the cell buffer exceeds each of the plurality of cell buffer thresholds; d.2) only when the currently used amount of the cell buffer exceeds each of the plurality of cell buffer thresholds, incrementing a threshold-excess counter; and d.3) detecting a value of the threshold-excess counter as threshold-excess count when the predetermined monitoring time period has elapsed.

In the step (e), the use rate $R_{USE}$ of the cell buffer is calculated by $R_{USE}=B/S \times 100 (\%)$, wherein for $N>1$, $B=\text{SUM}(|H_{i+1}-H_i| \times C_i) + H_N \times C_N$, and for $N=1$, $B=H_1 \times C_1$, where B is a total buffer used amount of the cell buffer, S is the received cell count, $C_i$ (i=1, 2, ... N) is an $i^{th}$ cell buffer threshold of the plurality of cell buffer thresholds, $H_i$ is the number of times the currently used amount of the cell buffer has exceeded the $i^{th}$ cell buffer threshold, and $\text{SUM}(|H_{i+1}-H_i| \times C_i)$ is defined as the sum total of $(|H_{i+1}-H_i| \times C_i)$ from i=1 to i=N-1.

In the step (a), a predetermined monitoring time period and a plurality of cell buffer thresholds may be allowed to be changed for each of the lines.

The ATM switch may include a plurality of cell buffers each corresponding to different QoS (quality of service) classes.

In the step (a), the plurality of cell buffer thresholds may correspond to different cell lose priorities.

According to another aspect of the present invention, an ATM switching system includes; a switch section having a plurality of cell buffers each connected to lines in an ATM network; and a cell buffer use rate monitor for monitoring a use rate of a cell buffer connected to a line The cell buffer use rate monitor comprises; a memory for setting a predetermined monitoring time period and a plurality of cell buffer thresholds, a cell detector for detecting reception and transmission of a cell; a counting controller for counting cells received at the cell buffer for the predetermined monitoring time period to produce a received cell count, counting a currently used amount of the cell buffer, and counting a number of times the currently used amount of the cell buffer has exceeded each of the plurality of cell buffer thresholds for the predetermined monitoring time period to produce a threshold-excess count; and a calculator for calculating the use rate of the cell buffer based on the received cell count and the threshold-excess count.

DETAILED DESCRIPTION OF THE PREFERRED EMBODIMENTS

Figure 1:
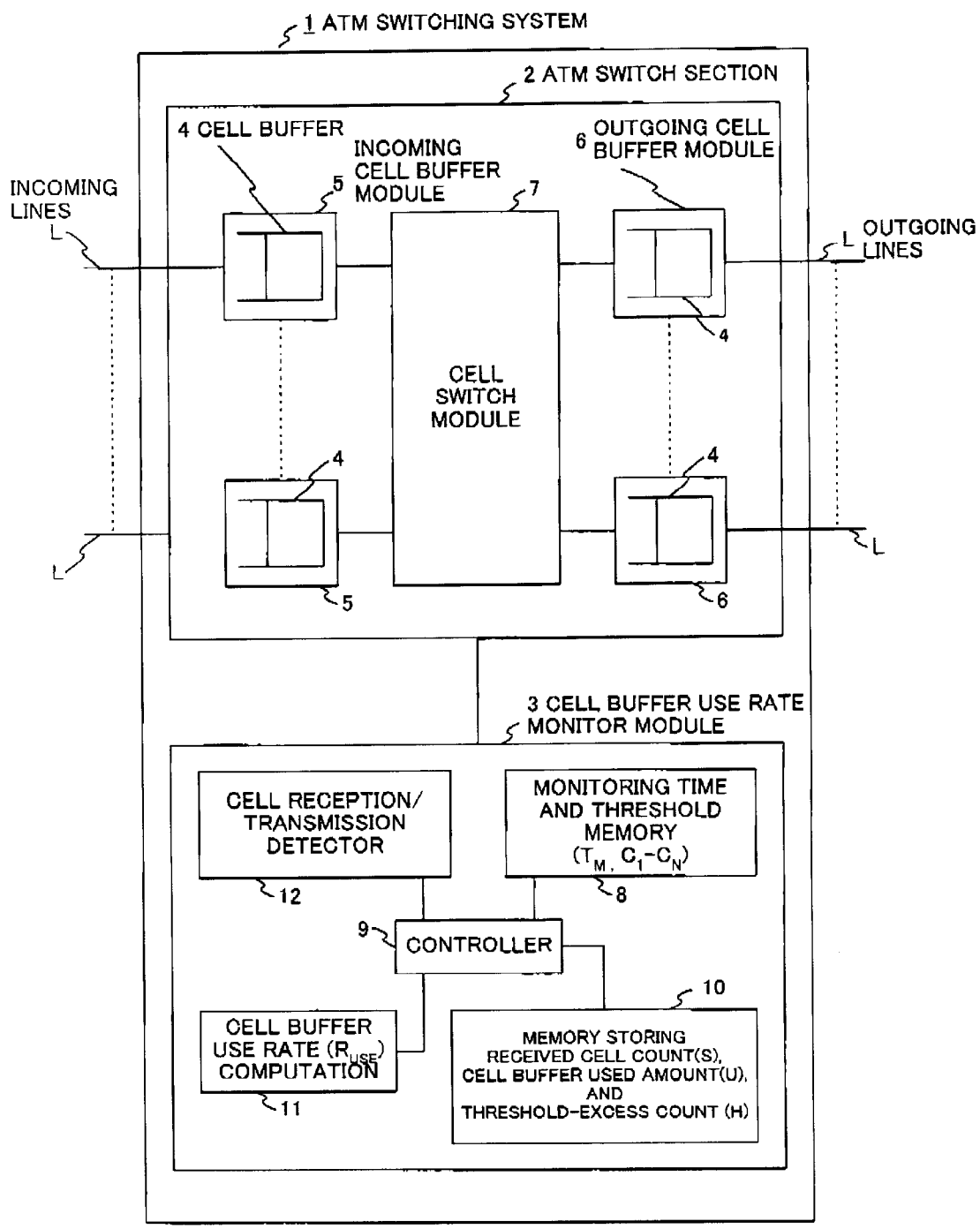
FIG. 1 is a block diagram showing the configuration of an ATM switching system according to a first embodiment of the present invention.

As shown in FIG. 1, an ATM switching system 1 according to a first embodiment of the present invention is provided with an ATM switch section 2 and a cell buffer use rate monitor module 3. The ATM switch section 2 includes a plurality of incoming cell buffer modules 5, which are each connected to incoming lines L. The incoming cell buffer modules 5 have a cell buffer 4 therein. The ATM switch section 2 includes a plurality of outgoing cell buffer modules 6, which are each connected to outgoing lines L. Each of the outgoing cell buffer modules 6 has a cell buffer 4 therein.

The respective incoming cell buffer modules 5 are connected to input ports of a cell switch module 7. The respective outgoing cell buffer modules 6 are connected to output ports of the cell switch module 7. In the cell switch module 7, each of the input ports of the cell switch module 7 is connected to a selected one of the outgoing cell buffer modules 6 depending on the routing information included in the header of each cell.

Here, a single buffer memory is shared among the incoming/outgoing cell buffer modules 5 and 6. Alternatively, a single buffer memory may be shared among the incoming cell buffer modules 5 and another single buffer memory may be shared among the outgoing cell buffer modules 6. An appropriate amount of buffer memory may be dynamically allocated to the incoming/outgoing cell buffer modules 5 and 6 depending on respective traffics thereof.

An incoming cell is stored in a cell buffer 4 of a corresponding incoming cell buffer module 5 and is transferred to a cell buffer 4 of a selected outgoing cell buffer module 6 by the cell switch module 7. Thereafter, the stored cell in the selected output cell buffer 4 is forwarded to the corresponding outgoing line L. In this manner, the cell buffer 4 is used to store the cell in the ATM switch section 2 and cell switching is performed. A cell buffer use rate of the cell buffer 4 is calculated and monitored by the cell buffer use rate monitor module The cell buffer use rate monitor module 3 includes a setting data memory 8, a cell buffer controller 9, a counter memory 10, a computation section 11, and a cell reception/transmission detector 12.

The setting data memory 8 previously stores a preset period of time for monitoring (hereafter, called a monitoring time $T_M$) and a plurality of cell buffer thresholds $C_1$–$C_N$. The counter memory 10 stores a received cell count S, a cell buffer used amount U, and a threshold-excess count $H_i$. The received cell count S is incremented every time an incoming cell has been stored into a corresponding incoming cell buffer 4. The cell buffer used amount U is a counter indicating a currently occupied amount of the cell buffer, More specifically, the cell buffer used amount U is incremented when a cell is stored into the cell buffer and is decremented when a cell is sent from the cell buffer. The threshold-excess count $H_i$ is the number of times the cell butter used amount U has exceeded a corresponding cell buffer thresholds $C_i$. More specifically, the threshold-excess count $H_i$ is incremented when the currently used amount of the cell buffer exceeds the corresponding cell buffer threshold $C_i$.

The cell buffer controller 9 uses the counter memory 10 to count or update the received cell count S within the monitoring time $T_M$, the cell buffer used amount U, and the threshold-excess count $H_i$. The cell buffer use rate computation section 11 calculates a cell buffer use rate $R_{USE}$ based on the received cell count S and the threshold-excess count $H_i$ that are stored in the counter memory 10. The details will be described later.

A monitoring time $T_M$, cell buffer thresholds $C_1$–$C_N$, and the total number (N) of the cell buffer thresholds are determined depending on required monitoring accuracy For example, to increase the monitoring accuracy, the total number (N) of cell buffer thresholds is increased and the monitoring time $T_M$ is shortened. The monitoring time $T_M$ and the cell buffer thresholds $C_1$–$C_N$ can be determined for each line L.

The cell reception/transmission detector 12 detects that a cell is stored into the output cell buffer 4 through the input call buffer and the ATM cell switch module 7 and is transmitted from the output cell buffer 4, When the cell buffer controller 9 is notified of the receiving of a cell by the cell reception/transmission detector 12, the cell buffer controller 9 updates (increments) the received cell count S and the cell buffer used amount U. If the updated cell buffer used amount U exceeds a cell buffer threshold $C_i$, the cell buffer controller 9 updates (increments) the threshold-excess count $H_i$. When the cell buffer controller 9 is notified of the sending of a cell by the cell reception/transmission detector 12, the cell buffer controller 9 updates (decrements) the cell buffer used amount U. These count values (received cell count S, cell buffer used amount U, and threshold-excess count $H_i$) are stored in the counter memory 10.

The cell buffer use rate computation section 11 calculates a cell buffer use rate $R_{USE}$ based on the received cell count S end the threshold-excess count $H_i$ as described later.

Figure 2A:
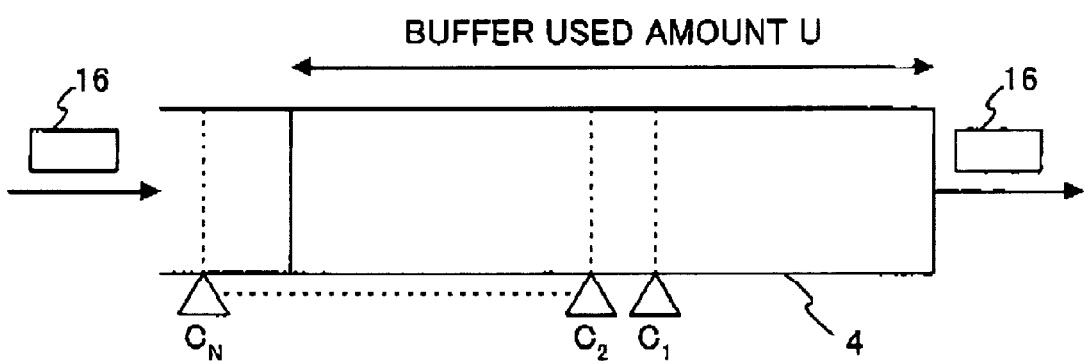
FIG. 2A is a schematic diagram showing a cell buffer having N thresholds according to the first embodiment of the present invention.

As shown in FIG. 2A, a plurality of cell buffer thresholds $C_i$ (i=1 to N; N is the number of thresholds) are set in a cell buffer 4. When receiving a cell 16 from a corresponding incoming line L, the incoming cell is stored in a corresponding incoming cell buffer 4. At this time, the received cell count S is incremented and the cell buffer used amount U is also incremented. Then, the cell buffer used amount U is compared to each of the cell buffer thresholds $C_1$–$C_N$ to determine whether a corresponding threshold-excess count $H_i$ is incremented.

Figure 2B:
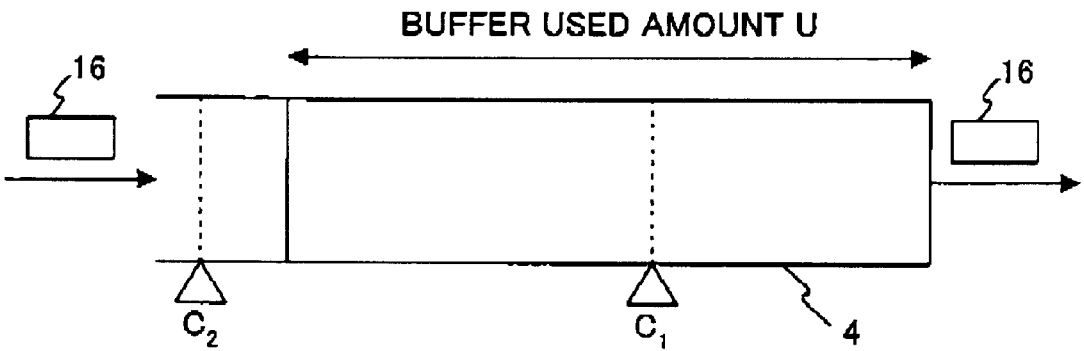
FIG. 2B is a schematic diagram showing a cell buffer having two thresholds according to the first embodiment of the present invention.

Referring to FIG. 2B, two cell buffer thresholds $C_1$ and $C_2$ are set in a cell buffer 4. As described before, the number N of cell buffer thresholds is determined depending on necessary monitoring accuracy and the permitted amount of memory. The larger the number of cell buffer thresholds, the higher the monitoring accuracy. In some cases, two cell buffer thresholds $C_1$ and $C_2$ as shown in FIG. 2B may provide a sufficiently precise monitoring function with relatively small memory capacity.

Figure 3:
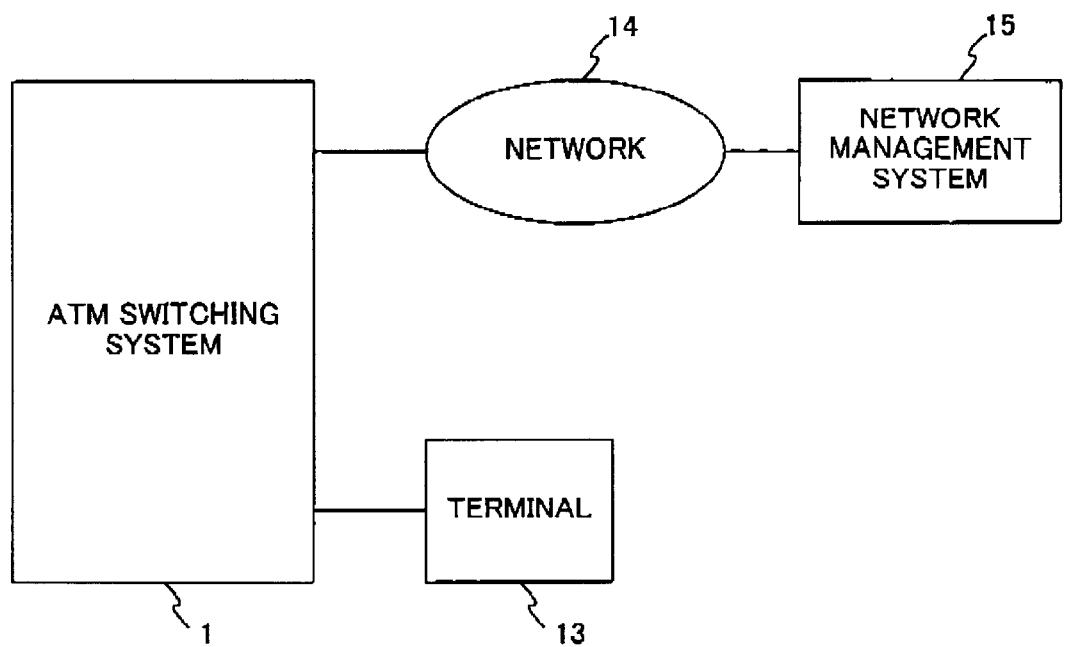
FIG. 3 s a diagram showing a network configuration in which a terminal and a network management system are connected to the ATM switching system of FIG. 1 through a network.

As shown in FIG. 3, the ATM switching system according to the present invention is connected to a maintenance terminal 13 or a network management system 15 via a network 14. The maintenance terminal 13 or the network management system 15 issues a monitoring instruction of a cell buffer use rate to the ATM switching system 1. Following the monitoring instruction, the ATM switching system 1 starts monitoring the cell buffer use rate of a cell buffer corresponding to a designated line. The calculated cell buffer use rate is transmitted to the maintenance terminal 13 or the network management system 15.

OPERATION

Figure 4:
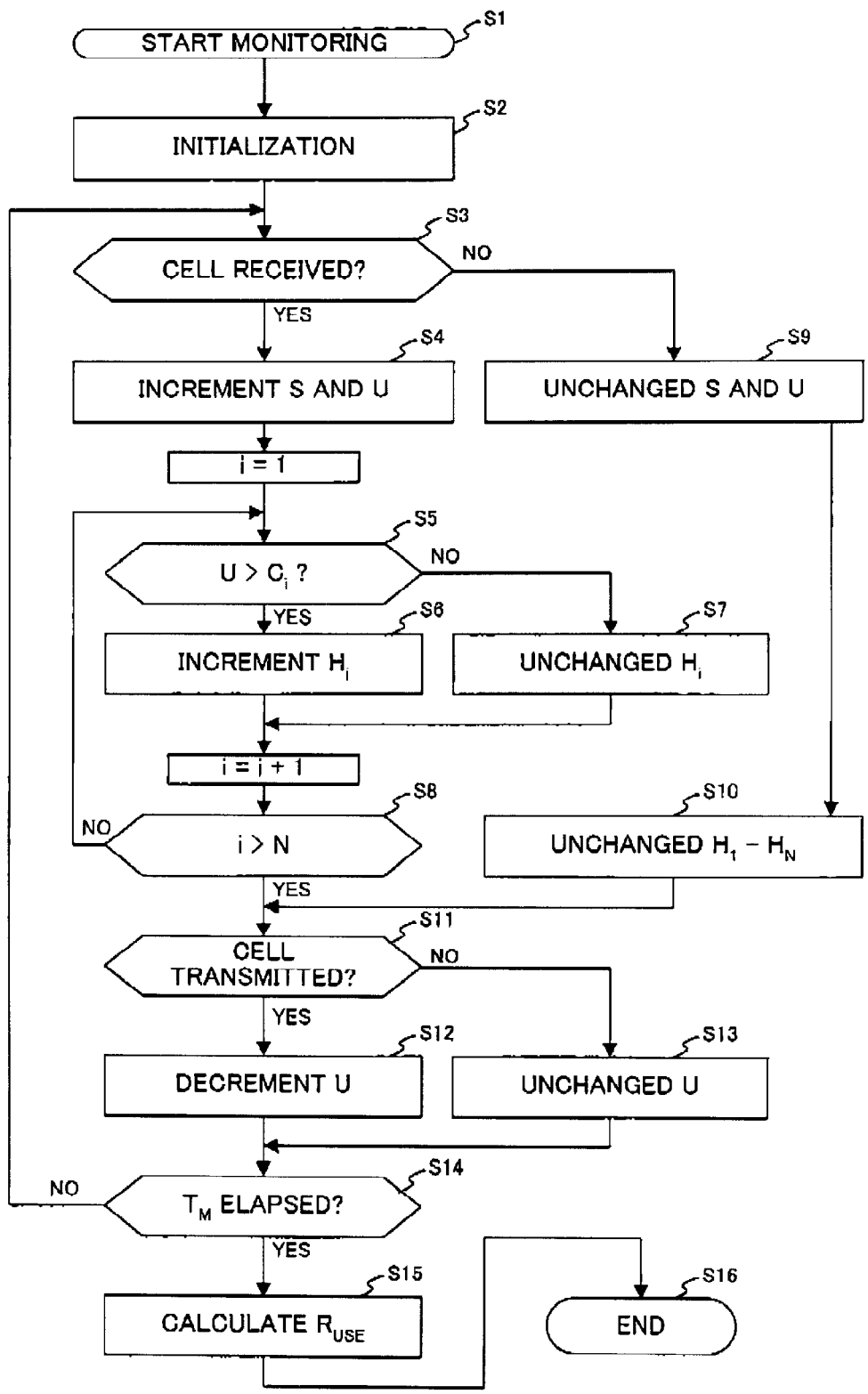
FIG. 4 is a flowchart showing the operation of the ATM switching system according to the first embodiment in the case of N thresholds.

Referring to FIG. 4, when the cell buffer controller 9 of the call buffer use rate monitor module 3 receives a monitoring instruction for monitoring a cell buffer use rate from the terminal 13 or the network management system 15, it starts the monitoring of the cell buffer 4 (step S1).

First, the cell buffer controller 9 reads the monitoring time $T_M$, the cell buffer thresholds $C_1$–$C_N$, and the number N of the cell buffer thresholds $C_1$–$C_N$ from the setting data memory 8 and sets the cell buffer thresholds $C_1$–$C_N$ in the cell buffer 4. Thereafter, the cell buffer controller 9 initializes the counter memory 10 to reset the received cell count S, cell buffer used amount U, and threshold-excess counts $H_i$ (step S2).

When a cell passes through the incoming cell buffer module 5 and the cell switch module 7 and is received by the cell buffer 4 of a selected outgoing cell buffer module 6, the cell reception/transmission detector 12 outputs a cell reception signal to the cell buffer controller 9 (YES at step S3).

When receiving the cell reception signal, the cell buffer controller 9 increments the received cell count S and the cell buffer used amount U stored in the counter memory 10 (step S4).

After a variable i is reset to 1, the cell buffer controller 9 compares the cell buffer used amount U to a cell buffer threshold $C_i$ to determine whether the cell buffer used amount U is greater than the cell buffer threshold $C_i$ (step S5). If the cell buffer used amount U exceeds the cell buffer threshold $C_i$ (YES at step S5), then the cell buffer controller 9 increments the threshold-excess count $H_i$ (step S6). If the cell buffer used amount U is not greater than the cell buffer threshold $C_i$ (NO at step S5), then the cell buffer controller 9 does not update the threshold-excess count $H_i$ (step S7). Thereafter, the variable i is incremented by one and then the steps S5–S7 are repeatedly performed until the variable i reaches N (step S8).

On the other hand, when no cell is received (NO at step S3), neither the received call count S nor the cell buffer used amount U is updated (step S9) and further none of the threshold-excess counts $H_1$–$H_N$ is also updated (step S10).

When the variable i is greater than N (YES at step S8) or no cell is received (NO at step S3), it is determined whether a cell is transmitted from the output cell buffer (step S11). When the cell buffer controller 9 is notified of the sending of a cell by the cell reception/transmission detector 12 (YES at step S11), the cell buffer controller 9 decrements the cell buffer used amount U (step S12). When no cell is transmitted from the output cell buffer (NO at step S11), the cell buffer used amount U is not updated (step S13).

Thereafter, the cell buffer controller 9 determines whether the monitoring time TM has elapsed (step S14). If the monitoring time TM has not elapsed yet (NO at step S14), then the cell buffer controller 9 repeatedly performs the steps S3–S13 until the monitoring time TM has elapsed.

When the monitoring time TM has elapsed (YES at step S14), the cell buffer controller 9 reads the received cell count S and the threshold-excess counts $H_i$ from the counter memory 10 and transfers them to the cell buffer use rate computation section 11. The cell buffer use rate computation section 11 calculates a cell buffer use rate $R_{USE}$ based on the received cell count S and the threshold-excess count $H_i$ (step S15).

The cell buffer use rate $R_{USE}$ is calculated according to the following formula:

$R_{USE} = B/S \times 100 (\%)$, for $N>1$, $B = \text{SUM}(|H_{i+1} - H_i| \times C_i) + H_N \times C_N$, and for $N=1$, $B = H_1 \times C_1$, where B is the total buffer use amount, S is the received cell count, $C_i$ (i=1, 2, ... N) is an $i^{th}$ cell buffer threshold, $H_i$ is the number of times a cell buffer used amount has exceeded the $i^{th}$ cell buffer threshold, and $\text{SUM}(|H_{i+1} - H_i| \times C_i)$ is defined as the sum total of $(|H_{i+1} - H_i| \times C_i)$ from i=1 to i=N–1.

In this way, a cell buffer use rate $R_{USE}$ is calculated by the cell buffer use rate computation section 11 and then the monitoring procedure is terminated (step S16).

Hereafter, the case of two cell buffer thresholds (N=2) will be described by referring to FIG. 4.

It is assumed that the monitoring time $T_M$=300 seconds, a first threshold $C_1$=500 cells, and the second threshold $C_2$=800 cells, which are previously stored in the setting data memory 8.

When the cell buffer controller 9 of the cell buffer use rate monitor module 3 receives a monitoring instruction for monitoring a cell buffer use rate from the terminal 13 or the network management system 15, it starts the monitoring of the cell buffer 4 (step S1).

First, the cell buffer controller 9 reads the monitoring time $T_M$=300 sec, the cell buffer thresholds $C_1$=500 cells and $C_2$=800 cells, and N=2 from the setting data memory 8 and sets the cell buffer thresholds $C_1$ and $C_2$ in the cell buffer 4 as shown in FIG. 2B. Thereafter, the cell buffer controller 9 initializes the counter memory 10 to reset the received cell count S, cell buffer used amount U, and threshold-excess counts $H_i$ (step S2).

When a cell passes through the incoming cell buffer module 5 and the cell switch module 7 and is received by the sell buffer 4 of a selected outgoing cell buffer module 6, the cell reception/transmission detector 12 outputs a cell reception signal to the cell buffer controller 9 (YES at step S3).

When receiving the cell reception signal, the cell buffer controller 9 increments the received cell count S and the cell buffer used amount U stored in the counter memory 10 (step S4).

After a variable i is reset to 1, the cell buffer controller 9 compares the cell buffer used amount U to a cell buffer threshold $C_1$=500 cells to determine whether U>500 (step S5). If $U > C_{1=500}$ (YES at step S5), then the cell buffer controller 9 increments the threshold-excess count $H_i$ (step S6). If the cell buffer used amount U is not greater than the cell buffer threshold $C_1$=500 (NO at step S5), then the cell buffer controller 9 does not update the threshold-excess count $H_1$ (step S7) Thereafter, the variable i is incremented by one, that is, i=2, and then the steps S5–S7 are repeatedly performed. After the step S6 or S7, the variable 1=2 is incremented by one, and therefore it is determined that i>2 (YES at step S8).

For example, if the cell buffer used amount U=600 cells ($C_1<U<C_2$), then the threshold-excess count $H_1$ is incremented and the threshold-excess count $H_2$ is not updated.

On the other hand, when no cell is received (NO at step S3), neither the received cell count S nor the cell buffer used amount U is updated (step S9) and further none of the threshold-excess counts $H_1$ and $H_2$ is also updated (step S10).

When the variable i is greater than N=2 (YES at step S8) or no cell is received (NO at step S3), it is determined whether a cell is transmitted from the output cell buffer (step S11). When the cell buffer controller 9 is notified of the sending of a cell by the cell reception/transmission detector 12 (YES at step S11), the cell buffer controller 9 decrements the cell buffer used amount U (step S12). When no cell is transmitted from the output cell buffer (NO at step S11), the cell buffer used amount U is not updated (step S13).

Thereafter, the cell buffer controller 9 determines whether the monitoring time $T_M$=300 sec has elapsed (step S14). If 300 seconds have not elapsed yet (NO at step S14), then the cell buffer controller 9 repeatedly performs the steps S3–S13 until 300 seconds has elapsed.

When $T_M$=300 sec has elapsed (YES at step S14), the cell buffer controller 9 reads the received cell count S and the threshold-excess counts $H_1$ and $H_2$ from the counter memory 10 and transfers them to the cell buffer use rate computation section 11. The cell buffer use rate computation section 11 calculates a cell buffer use rate $R_{USE}$ based on the received cell count S and the threshold-excess counts $H_1$ and $H_2$ (step S15).

Assuming S=300000 cells, $H_1$=360, and $H_2$=60, the cell buffer use rate computation section 11 first calculates the total buffer use amount B by $|H_2-H_1|\times C_1+H_2\times C_2$. Since $C_2$=800 and $C_1$=500, B=|60−360|×500+60×800=198000. Therefore, the current cell buffer use rate $R_{USE}$ for 300 seconds is 198000/300000×100=66(%).

In this way, the current cell buffer use rate $R_{USE}$ is calculated by the cell buffer use rate computation section 11 and then the monitoring procedure is terminated (step S16).

Second Embodiment

Figure 5:
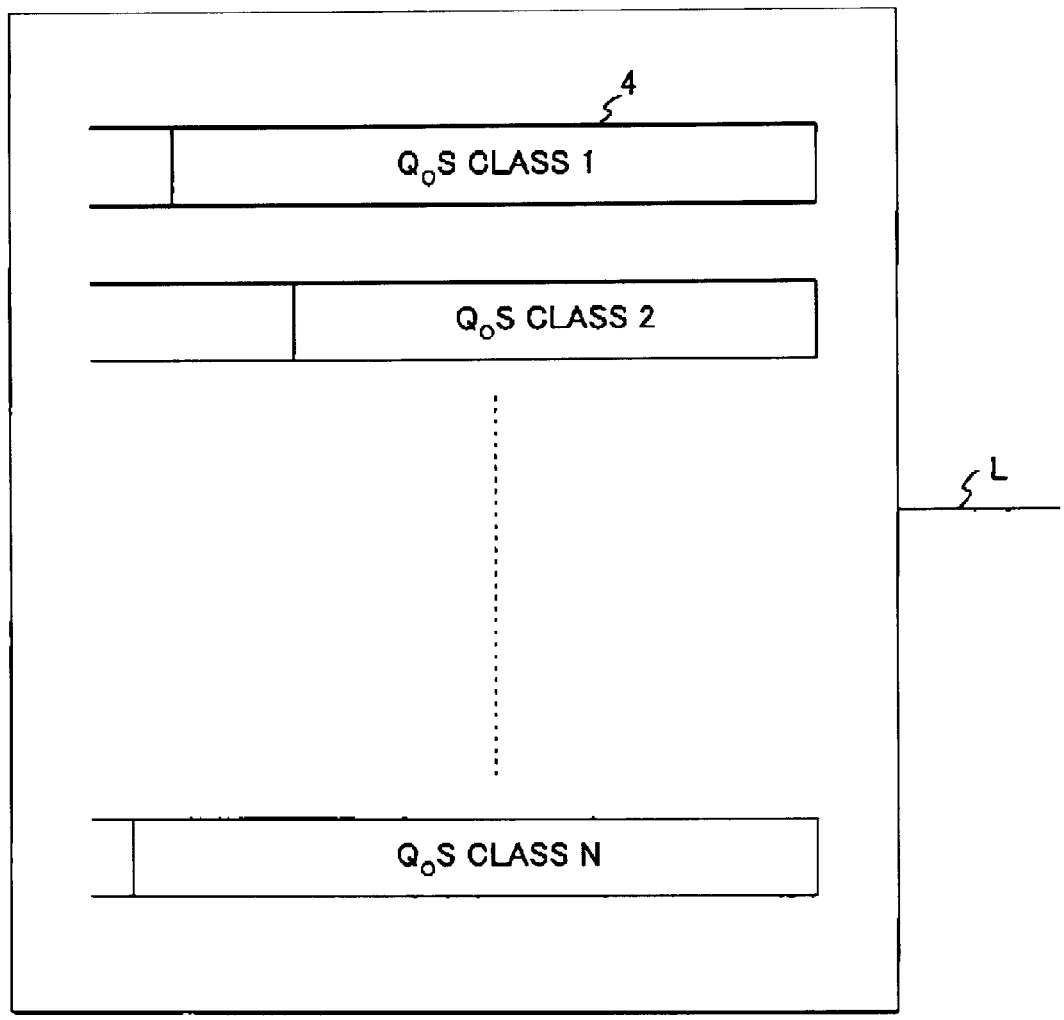
FIG. 5 is a schematic diagram showing an outgoing cell buffer module according to a second embodiment of the present invention.

Referring to FIG. 5, in the second embodiment, the cell buffer 4 in the outgoing cell buffer module 6 for each output port is divided into N sections each corresponding to Quality of Service class 1 to N, which allows each of the specified QoS Classes to be satisfied. For example, QoS Class 1 supports a QoS that meets constant bit rate (CBR) performance requirements and QoS Class 2 supports a QoS that meets variable bit rate (VAR) performance requirements.

According to the second embodiment, by monitoring a cell buffer use rate in units of a cell buffer allocated for each of the QoS Classes, it is possible to detect how much buffer amount is used, for example, for data transfer. Therefore, maintenance such as adjustment of allocated buffers can be performed.

Third Embodiment

Figure 6:
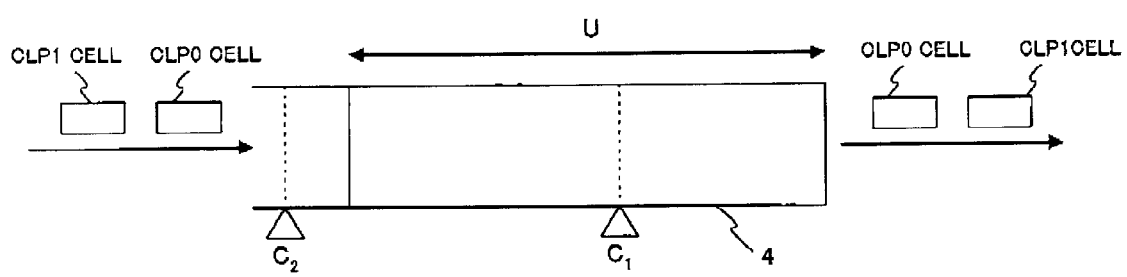
FIG. 6 is a schematic diagram showing a cell buffer according to a third embodiment of the present invention.

As shown in FIG. 6, a plurality of cell buffer thresholds are determined depending on CLP (Call Loss Priority), allowing a cell buffer use rate for each CLP cell to be monitored, for example, CLP0: high priority cell and CLP1: low priority cell. In the example shown in FIG. 6, the threshold of a CLP1 cell is set to $C_1$ and the threshold of a CLP0 cell is set to $C_2$.

Low and high priority cells are mixed in call traffic. In case of cell loss, therefore, it is necessary to properly select a low priority cell in the first place. According to the third embodiment, a cell buffer use rate can be monitored in accordance with a cell priority. Therefore, criteria can be obtained as to whether the cell loss control correctly functions and which value a threshold at which a low priority cell is discarded should be set for.

The present invention enables various modifications within the scope of the technical items described in the following claims without being limited to the aforementioned embodiments.

According to the present invention, a monitoring time and a plurality of cell buffer thresholds are previously set in a setting data memory and a cell buffer use rate is calculated based on the number of cells received within the monitoring time and the number of times a currently used cell buffer amount has exceeded each of the cell buffer thresholds The amount of a memory required for detecting the currently used cell buffer amount can be dramatically reduced.

Further, in the case where a cell buffer use rate is high in a line and loss of cell occurs due to an overflow of the cell buffer, the required Cell Loss Ratio can be satisfied by increasing the bandwidth allocated to that line, distributing the traffic by installing a new line, and/or increasing the capacity of the shared buffer of a buffer module.

On the contrary, in the case where a cell buffer use rate is low in a line and the cell buffer use rate of another line is high, the use efficiency of network resources can be improved by redistributing the capacity of the shared buffer among the buffer modules and adjusting traffic (by changing the routing information for a connection).

What is claimed is:

1. A method for monitoring a use rate of a cell buffer in an ATM (asynchronous transfer mode) switch, wherein the cell buffer is connected to a line in an ATM network, comprising the steps of:
    a) setting a predetermined monitoring time period and a plurality of cell buffer thresholds;
    b) counting cells received at the cell buffer for the predetermined monitoring time period to produce a received cell count;
    c) detecting a currently used amount of the cell buffer;
    d) counting a number of times the currently used amount of the cell buffer has exceeded each of the plurality of cell buffer thresholds for the predetermined monitoring time period to produce a threshold-excess count; and
    e) calculating the use rate of the cell buffer based on the received cell count and the threshold-excess count.

2. The method according to claim 1, wherein the step (c) comprises the steps of:
    c.1) incrementing a cell counter when a cell has been received at the cell buffer;
    c.2) decrementing the cell counter when a cell has been transmitted from the cell buffer; and
    c.3) detecting a current value of the cell counter as the currently used amount of the cell buffer.

3. The method according to claim 1, wherein the step (d) comprises the steps of:
    d.1) when a cell has been received at the cell buffer, determining whether the currently used amount of the cell buffer exceeds each of the plurality of cell buffer thresholds;
    d.2) only when the currently used amount of the cell buffer exceeds each of the plurality of cell buffer thresholds, incrementing a threshold-excess counter; and d.3) detecting a value of the threshold-excess counter as threshold-excess count when the predetermined monitoring time period has elapsed.

4. The method according to claim 1, wherein in the step (e), the use rate $R_{USE}$ of the cell buffer is calculated by $R_{USE}=B/S\times100(\%)$, wherein for $N>1$, $B=\text{SUM}(|H_{i+1}-H_i|\times C_i)+H_N\times C_N$, and for $N=1$, $B=H_1\times C_1$, where B is a total buffer used amount of the cell buffer, S is the received cell count, $C_i$ (i=1, 2, ... N) is an $i^{th}$ cell buffer threshold of the plurality of cell buffer thresholds, $H_i$ is the number of times the currently used amount of the cell buffer has exceeded the $i^{th}$ cell buffer threshold, and $\text{SUM}(|H_{i+1}-H_i|\times C_i)$ is defined as the sum total of $(|H_{i+1}-H_i|\times C_i)$ from i=1 to i=N−1.

5. The method according to claim 1, wherein in the step (a), a predetermined monitoring time period and a plurality of cell buffer thresholds are allowed to be changed for each of a plurality of lines connected to the ATM network.

6. The method according to claim 1, wherein the ATM switch includes a plurality of cell buffers each corresponding to different QoS (quality of service) classes.

7. The method according to claim 1, wherein in the step (a), the plurality of cell buffer thresholds correspond to different cell loss priorities.

8. A system for monitoring a use rate of a cell buffer in an ATM (asynchronous transfer mode) switch, wherein the cell buffer is connected to a line in an ATM network, comprising:

a memory for setting a predetermined monitoring time period and a plurality of cell buffer thresholds;

a first counter for counting cells received at the cell buffer for the predetermined monitoring time period to produce a received cell count;

a second counter for detecting a currently used amount of the cell buffer;

a third counter for counting a number of times the currently used amount of the cell buffer has exceeded each of the plurality of cell buffer thresholds for the predetermined monitoring time period to produce a threshold-excess count; and a calculator for calculating the use rate of the cell buffer based on the received cell count and the threshold-excess count.

9. The system according to claim 8, wherein the second counter is incremented when a cell has been received at the cell buffer, is decremented when a cell has been transmitted from the cell buffer, wherein a current value of the second counter is used as the currently used amount of the cell buffer.

10. The system according to claim 8, wherein the third counter comprises:

a comparator for comparing the currently used amount of the cell buffer to each of the plurality of cell buffer thresholds to determine whether the currently used amount of the cell buffer exceeds each of the plurality of cell buffer thresholds, when a cell has been received at the cell buffer; and a controller for incrementing a threshold-excess counter only when the currently used amount of the cell buffer exceeds each of the plurality of cell buffer thresholds, wherein a value of the threshold-excess counter is used as threshold-excess count when the predetermined monitoring time period has elapsed.

11. The system according to claim 8, wherein the calculator calculates the use rate $R_{USE}$ of the cell buffer by $R_{USE}=B/S\times100(\%)$, wherein for $N>1$, $B=\text{SUM}(|H_{i+1}-H_i|\times C_i)+H_N\times C_N$, and for $N=1$, $B=H_1\times C_1$, where B is a total buffer used amount of the cell buffer, S is the received cell count, $C_i$ (i=1, 2, ... N) is an $i^{th}$ cell buffer threshold of the plurality of cell buffer thresholds, $H_i$ is the number of times the currently used amount of the cell buffer has exceeded the $i^{th}$ cell buffer threshold, and $\text{SUM}(|H_{i+1}-H_i|\times C_i)$ is defined as the sum total of $(|H_{i+1}-H_i|\times C_i)$ from i=1 to i=N−1.

12. The system according to claim 8, wherein a predetermined monitoring time period and a plurality of cell buffer thresholds are allowed to be changed for each of a plurality of lines connected to the ATM network.

13. The system according to claim 8, wherein the ATM switch includes a plurality of cell buffers each corresponding to different QoS (quality of service) classes.

14. The system according to claim 8, wherein the plurality of cell buffer thresholds correspond to different cell loss or priorities.

15. An ATM (asynchronous transfer mode) switching system comprising:

a switch section having a plurality of cell buffers each connected to lines in an ATM network; and a cell buffer use rate monitor for monitoring a use rate of a cell buffer connected to a line, wherein the cell buffer use rate monitor comprises:

a memory for setting a predetermined monitoring time period and a plurality of cell buffer thresholds;

a cell detector for detecting reception and transmission of a cell;

a counting controller for counting cells received at the cell buffer for the predetermined monitoring time period to produce a received cell count, counting a currently used amount of the cell buffer, and counting a number of times the currently used amount of the cell buffer has exceeded each of the plurality of cell buffer thresholds for the predetermined monitoring time period to produce a threshold-excess count; and a calculator for calculating the use rate of the cell buffer based on the received cell count and the threshold-excess count.

16. The ATM switching system according to claim 15, wherein a desired amount of memory in a shared memory is allocated to each of the plurality of cell buffers depending on traffic of a corresponding line.

17. The ATM switching system according to claim 15, wherein a predetermined monitoring time period and a plurality of cell buffer thresholds are allowed to be changed for each of the lines.

18. The ATM switching system according to claim 15, wherein the plurality of cell buffers each corresponds to different QoS (quality of service) classes.

19. The method according to claim 1, wherein the received cell count is a cumulative cell count, without decrementing any cells received.

20. The system according to claim 8, wherein the received cell count is a cumulative cell count, without decrementing any cells received.

* * * * *